United States Patent
Douglas

(10) Patent No.: US 6,311,821 B1
(45) Date of Patent: Nov. 6, 2001

(54) MATERIAL PROCESSING PLANT

(76) Inventor: Patrick Joseph Douglas, Southeries, College Green, Castletown Isle of Man (GB), IM9 1BE (*) Notice: Subject to any disclaimer, the term of this patent is extended or adjusted under 35 U.S.C. 154(b) by 0 days.

(21) Appl. No.: 09/424,601

(22) PCT Filed: Apr. 1, 1999

(86) PCT No.: PCT/GB99/00859

§ 371 Date: Feb. 2, 2000

§ 102(e) Date: Feb. 2, 2000

(87) PCT Pub. No.: WO99/49976

PCT Pub. Date: Oct. 7, 1999

(30) Foreign Application Priority Data

Apr. 1, 1998 (GB) .................................................. 9806882
Apr. 9, 1998 (GB) .................................................. 9807707

(51) Int. Cl.$^7$ .................................................. B65G 47/18
(52) U.S. Cl. .................... 198/311; 198/302; 414/332; 414/919; 241/101.74
(58) Field of Search .................... 198/300, 302, 198/311; 414/919, 332; 180/21, 208, 209; 209/420, 421; 241/101.74–101.76

(56) References Cited

U.S. PATENT DOCUMENTS

| 275,453 | 4/1883 | Anderson . |
| 311,137 | 1/1885 | Miller . |
| 311,317 | 1/1885 | Hasselman . |
| 326,801 | 9/1885 | Sprague . |

(List continued on next page.)

FOREIGN PATENT DOCUMENTS

| 1170227 | 5/1964 | (DE) . |
| 2330044 | 12/1973 | (DE) . |
| 0338752 | 10/1989 | (EP) . |
| 0 547 440 A | 6/1993 | (EP) . |
| 2316005 | 1/1977 | (FR) . |
| 2332682 | 6/1977 | (FR) . |
| 2 568 487 A | 2/1986 | (FR) . |
| 1231808 | 5/1971 | (GB) . |
| 1 259 128 A | 1/1972 | (GB) . |
| 1271008 | 4/1972 | (GB) . |
| 1414786 | 11/1975 | (GB) . |
| 1480688 | 7/1977 | (GB) . |
| 2001595 | 2/1979 | (GB) . |
| 2 072 532 A | 10/1981 | (GB) . |
| 2100692 | 1/1983 | (GB) . |
| 2119290 | 11/1983 | (GB) . |
| 2157645 | 10/1985 | (GB) . |
| 2175559 | 12/1986 | (GB) . |
| 2200613 | 8/1988 | (GB) . |
| 1105398 | 7/1984 | (SU) . |
| 85/03652 | 8/1985 | (WO) . |
| 89/09740 | 10/1989 | (WO) . |

Primary Examiner—Joseph E. Valenza
(74) Attorney, Agent, or Firm—Merchant & Gould P.C.

(57) ABSTRACT

A material processing plant e.g. a crusher or shredder (2) adapted to be suspended between a first wheeled unit (3) and a second wheeled unit (4) during transport, in which the first and second units have respective couplings, and in which the plant comprises: a plant frame; and front coupling and a rear coupling provided at the front and rear of the plant frame respectively; an arrangement of the front and rear couplings such that when the front coupling and the rear coupling of the plant frame are connected to the respective couplings of the first and second wheeled units, the plant (2) is suspended between the first and second units; and a lifting means (37) connected to one or both of the wheeled units (3,4), or to the plant frame, and operable to lift the plant for connecting the couplings of the plant frame to the respective couplings of the first and second wheeled units.

15 Claims, 3 Drawing Sheets

U.S. PATENT DOCUMENTS

| | | |
|---|---|---|
| 966,294 | 8/1910 | Arps . |
| 1,441,851 | 1/1923 | Hartley . |
| 1,661,781 | 3/1928 | Whitnall . |
| 1,840,029 | 1/1932 | Garbe . |
| 1,846,668 | 2/1932 | Barber . |
| 2,022,146 | 11/1935 | Ossing . |
| 2,022,148 | 11/1935 | Ossing . |
| 2,141,482 | 12/1938 | McGraw . |
| 2,267,419 | 12/1941 | Oster . |
| 2,632,556 | 3/1953 | Alpers et al. . |
| 2,922,510 | 1/1960 | Zetterland . |
| 3,051,295 | 8/1962 | Moy . |
| 3,174,619 | 3/1965 | Krane . |
| 3,439,806 | 4/1969 | Kass et al. . |
| 3,841,464 | 10/1974 | Tome . |
| 4,058,198 | 11/1977 | O'Neill et al. . |
| 4,111,314 * | 9/1978 | Nelson ............................ 414/919 |
| 4,190,526 | 2/1980 | Bachand . |
| 4,231,467 | 11/1980 | Cheek . |
| 4,301,910 * | 11/1981 | Price ............................... 198/311 |
| 4,303,506 | 12/1981 | Finlay . |
| 4,591,432 | 5/1986 | Hartl . |
| 5,044,484 | 9/1991 | Douglas . |
| 5,086,911 | 2/1992 | Douglas . |
| 5,112,474 | 5/1992 | Douglas . |
| 5,460,332 * | 10/1995 | Frick .......................... 241/101.74 |

* cited by examiner

MATERIAL PROCESSING PLANT

The present invention relates to a material processing plant. More particularly, but not exclusively, the present invention relates to a material process plant adapted to be suspended between two separate wheeled units during transport. Examples of material processing plant with which the invention is concerned include a crusher or shredder, a screening device, and a combined crusher and screening device.

Screening plants are well known and typically comprise a plant frame and one or more discharge conveyors for discharging different fractions of screened material to different stock piles. Screening plants typically also comprise a propulsion means such as crawler tracks which make the plant readily manoeuvrable in a quarry but transport along a road usually requires the plant to be transported by a low loader. Although many screening plants can be folded into transport positions of reduced height or length, putting the plant on a low loader means that the screening plant is raised to a position high above ground level. The overall height of the low loader/screening plant combination can therefore be a problem when passing under bridges or along roads with overhanging trees.

Accordingly, in one aspect, the present invention provides a material processing plant adapted to be suspended between first and second separate wheeled units during transport, the first unit having a respective first coupling;
the second unit having a respective second coupling;
the plant comprising
  a plant frame;
  a front coupling and a rear coupling provided at the front and rear of the plant frame respectively;
  the front and rear couplings being arranged such chat when the front coupling is connected to the first coupling and when the rear coupling is connected to the second coupling, the plant is suspended between the first and second units; and,
  a lifting or lowering means connected to one or both of said units, or to the plant frame, and operable to lift the plant for connecting the first coupling to the front coupling and the second coupling to the rear coupling.

The plant of the invention has the advantage that it can be connected to the two separate wheeled units to produce a transport device which is not as high as a material processing plant/low loader combination.

The plant can further comprise a locomotion means. The locomotion means can comprise crawler tracks. This has the advantage that the plant can be moved independently of the wheeled units.

Preferably, the lifting means comprises a front jack and a rear jack for lifting the front and rear of the plant frame respectively.

The front and rear jacks can be adapted to lift the front and rear of the plant frame independently. This has the advantage that the front of the plant can be lifted and connected to the first unit before the rear end of the plant is lifted.

In a preferred arrangement, the first wheeled unit is a tractor unit and the second wheeled unit is a bogie unit.

Preferably, at least one of the front and rear couplings is connected by a pivot to the plant frame and is pivotable between an extended position for connection with the corresponding tractor or bogie coupling and a retracted position. This has the advantage that when the plant is not connected to the tractor unit and bogie unit the front and rear couplings can be pivoted to the retracted position so reducing the length of the screening plant so improving its manoeuvrability.

The plant may be a crusher or shredder, a screening device or a combination of a crusher/shredder and a screening device, and may further include a discharge conveyor.

In a further aspect of the invention there is provided a transport device comprising a tractor unit comprising a tractor coupling;
a bogie unit comprising a bogie coupling; and,
a material processing unit comprising
  a plant frame;
  a front coupling and a rear coupling provided at the front and rear of the plant frame respectively;
  the front and rear couplings being arranged such that when the front coupling is connected to the tractor coupling and when the rear coupling is connected to the bogie coupling, the plant is suspended between the tractor unit and the bogie unit; and,
  a lifting means connected to the plant frame adapted to lift the plant for connecting the tractor coupling to the front coupling and the bogie coupling to the rear coupling.

The transport device of the present invention has the advantage that it is of a reduced height compared to e.g. a screening plant and low loader.

In a further aspect of the invention there is provided a method of assembly of a transport device, the transport device comprising a tractor unit comprising a tractor coupling;
a bogie unit comprising a bogie coupling; and,
a material processing unit comprising
a plant frame;
  a front coupling and a rear coupling provided at the front and rear or the plant frame respectively;
  the front and real couplings being arranged such that when the front coupling is connected so the tractor coupling and when the rear coupling is connected to one bogie coupling, the plant is
  suspended between the tractor unit and the bogie unit; and,
  a lifting means connected to the plant frame adapted to lift the plant for connecting the tractor coupling to the front coupling and the bogie coupling to the rear coupling,
comprising the steps of
  extending the lifting means to lift the plant frame from the ground;
  interengaging the tractor coupling with the front coupling and the bogie coupling and the rear coupling; and,
  retracting the lifting means so suspending the plant between the tractor unit and bogie unit.

Preferably, the front end of the plant frame is lifted and the front coupling connected to the tractor coupling before the rear end of the frame is lifted and the rear coupling connected to the bogie coupling. This has the advantage that as only one end of the plant is raised from the ground at a time the screening plant is always stable.

The present invention will now be described by way of example but not in any limitative sense with reference to the figures in which.

Figure 1:
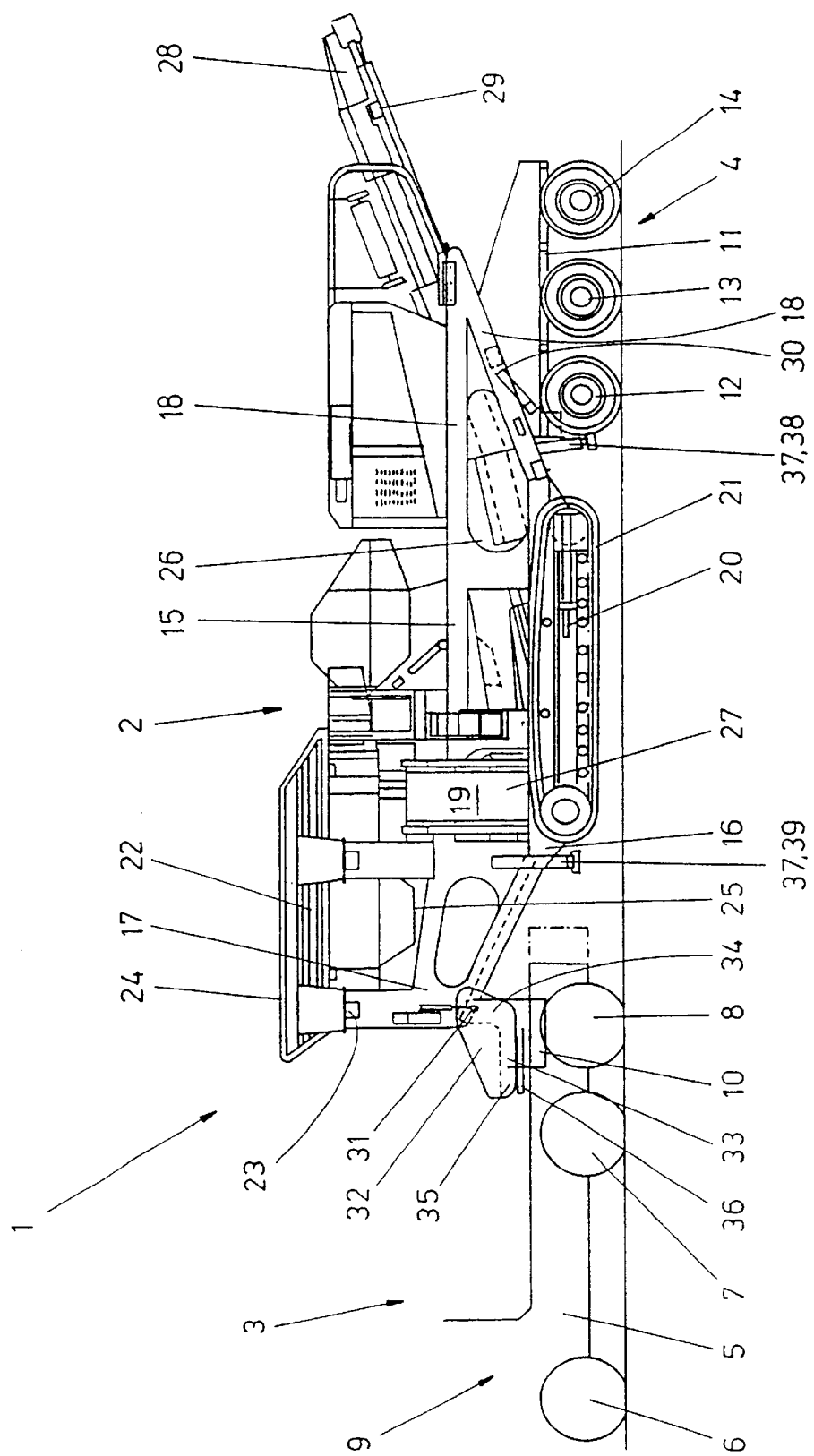
FIG. 1 shows a transport device comprising a material processing plant, a tractor unit and a bogie unit.

Shown in FIG. 1 is a transport device 1 comprising a crushing plant 2, and first and second separate wheeled units, preferably comprising a tractor unit 3 and a bogie unit 4.

It should be understood that a crusher (or shredder) is one example only of a material processing plant with which the invention is concerned and other types of plant may be used e.g. a screening plant, or a combination of a screening and crushing/shredding plant.

The tractor unit 3 comprises a chassis 5 supported by wheels 6,7,8. The chassis 5 supports a drive unit 9 for supplying power to the wheels 6,7,8. Located over the rear wheels 7,8 and supported by the chassis 5 is a tractor coupling comprising an aperture (not shown)for engagement with a fifth wheel type coupling provided on the plant 2.

The bogie unit 4 comprises a bogie chassis 11 connected to a plurality of bogie wheels 12,13,14. Supported by the chassis 11 is a bogie coupling for coupling the screening plant 2 to the bogie unit 4. The bogie unit 4 is described in more detail with reference to FIG. 2.

The plant 2 comprises a plant frame e having a rectangular base 16, a forward support portion 17 and a rear support portion 18. The rectangular base 16 supports a motor unit 19 and a locomotion means 20. The locomotion means 20 comprises a pair of crawler tracks 21, one located on each side of the rectangular base 16. The crawler tracks 21 are used to manoeuvre the plant 2. The plant 2 further comprises a hopper 22 connected to the upper edge 23 of the forward support portion 17. The hopper 22 includes an entrance port 24 located on its upper surface and an exit port 25 located on its lower surface. A number of evenly spaced bars (not shown) extend across the entrance port 24. A discharge chute 26 extends from a first end 27 below the hopper to a second end 28 rearward of the rear support portion 18. The discharge chute 26 includes a conveyor belt 29 for transporting material received by the first end 27 to the second end 28 and then discharging this received material at a point proximate to the plant frame 15.

In use material to be crushed is deposited on the entrance port 24 of the hopper 22 by quarry machinery. The bars across the entrance port 24 only allow quarry material smaller than the separation between the bars to fall through the hopper 22 onto the first end 27 of the discharge chute 26. The bars across the entrance port 24 prevent quarry material larger than the spacing between the bars from passing through the hopper 22. The bars divert this material to the side of the plant frame 15.

Provided on the underside of the rear support portion 18 of the plant frame 15 is a rear coupling 30 comprising a fifth wheel connector (not shown) adapted for interengagement with the bogie coupling 15.

Connected by a pivot 31 to the forward support portion of the plant frame 15 is an L shaped pivot arm 32. The pivot arm 32 comprises substantially orthogonal first and second arms 33, 34. The end of the second arm 34 remote from the first arm 33 is connected to the pivot 31. Connected to the first arm 33 at a point remote from the second arm 34 is a front coupling 35 comprising a fifth wheel type coupling 36 suitable for engagement with the tractor coupling 18. The pivot arm 32 is shown in an extended position with the first arm 33 in the horizontal plane extending away from the screening plant 2. The pivot arm 32 can be pivoted from the extended position clockwise through approximately 90 degrees to the retracted position. In this position the second arm 34 lies in a vertical plane and abuts against the forward support portion 17 of the plant frame 15. The pivot arm 32 can be maintained in this position by a locking mechanism (not shown). The pivot arm 32 is typically maintained in the retracted position when not connected to the tractor unit 3 as this reduces the length of the plant 2 so increasing its manoeuvrability.

Extending from the plant frame 15 is a lifting means 37 comprising four hydraulic pistons 38,39, one located proximate to each of the four corners of the rectangular base 16 of the plant frame 15. The hydraulic pistons 38,39 are shown in a retracted position off the around.

Figure 2:
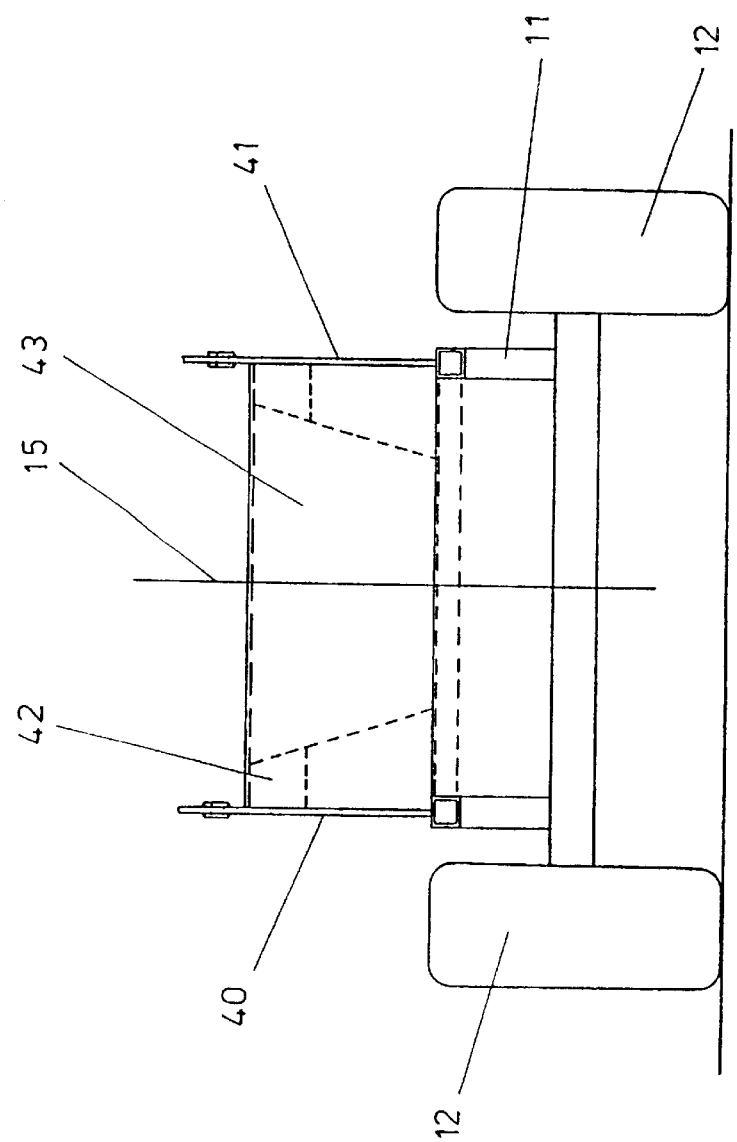
FIG. 2 shows a bogie unit according to the invention in end view.
Figure 3:
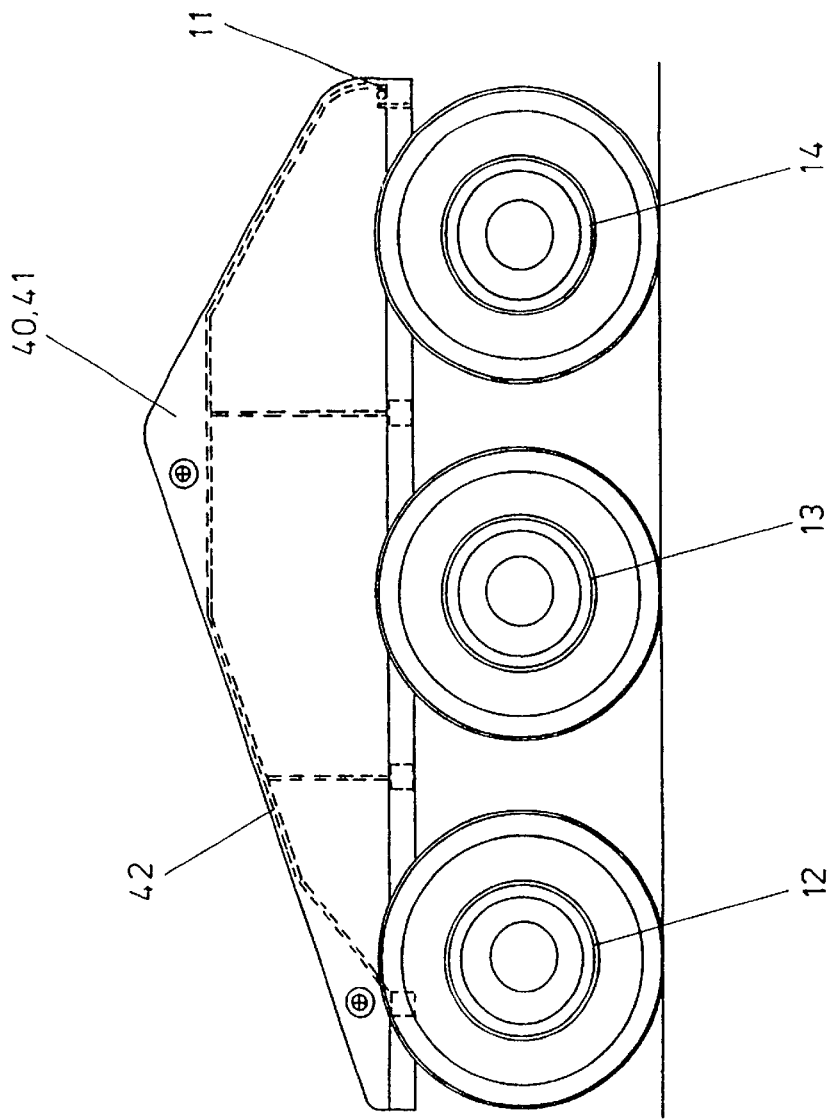
FIG. 3 shows a bogie unit according to invention in side view.

FIGS. 2 and 3 show the bogie unit 4 in detail. Extending upwardly from the bogie chassis 11 are two side walls 40,41 for guiding the rear support portion 18 of the plant frame 15 into correct alignment with the bogie unit 4. Extending between the side walls 40,41 is a guiding ramp 42 which extends upwardly away from the chassis as one moves from the front to the rear of the bogie chassis 11. Located within the guiding ramp 42 is the bogie coupling 15 which comprises an aperture 43 adapted to receive the rear coupling 30.

In order to assemble the transport device 1 shown in FIG. 1 the front pair of hydraulic pistons 38 is extended, raising a front portion of the crawler tracks 21 off the ground. The pivot arm 32 is then pivoted to the extended position so rotating the fifth wheel coupling 36 of the front coupling 35 into the horizontal plane. The front pistons 38 are then adjusted further if necessary until the front coupling 35 is at substantially the same height as the tractor coupling 10. The tractor unit 3 is then reversed towards the front coupling 35 and the tractor coupling 10 and front coupling 35 are interengaged.

Next, the rear pair of hydraulic pistons 39 are extended lifting the crawler tracks 21 off the ground. The rear pistons 39 are extended until the rear coupling 30 is at the same height as the bogie coupling 15. The bogie unit 4 is then moved towards the rear coupling 30 and the rear coupling 30 and bogie coupling 15 are interengaged.

Finally, all four pistons are retracted so suspending the plant 2 between the tractor unit 3 and the bogie unit 4.

In order to disassemble the transport device 1 into tractor unit 3, bogie unit 4 and plant 2 all four pistons 38,39 are extended until they touch the ground and support the weight of the plant 2. The tractor unit 3 and bogie unit 4 are then disengaged from the plant 2 and removed from the plant 2. The pistons 38,39 are then slowly retracted lowering the plant 2 until the crawler tracks 21 reach the ground and support the screening plant 2. The pistons 38,39 can then be fully retracted to a position where they are remote from the ground. The crawler tracks 21 can then be used to move the plant 2.

Other methods of assembling the transport device 1 are possible For example the rear pistons 39 could be extended and the rear coupling 30 engaged with the bogie coupling 11 before the forward pistons 38 are extended. Alternatively, both forward and rear pistons 38,39 could be extended raising the plant 2 from the ground before either of the tractor unit 3 or bogie unit 4 are engaged with the plant 2.

As an alternative to providing lifting means on the plant frame, it will be possible to provide lifting/lowering means one or both of the wheeled units, e.g. airbags, and operable load and unload the plant relative to the wheeled units.

What is claimed is:

1. A self-propelled material processing plant comprising:
a plant frame comprising front and rear ends;
endless tracks supporting the frame and operative to manoevre the plant over the ground in a self-propelled mode;

front and rear couplings provided on the plant frame for releasable engagement with respective couplings on first and second spaced apart wheeled units so that the plant can be suspended between the two units with the endless tracks out of contact with the ground in a transport mode of the plant;

lifting means operative to lift the plant so as to engage the couplings on the first and second wheeled units for suspended transport of the plant, said lifting means also being operative to allow the plant to be uncoupled from both units and to engage the ground via the endless tracks so that the plant can propel itself by the endless tracks and independently of the wheeled units; and wherein the plant frame comprises a fixed support with said rear coupling mounted thereon, said support being movable downwardly with the plant frame under action of the lifting means to engage the second wheeled unit so as to suspend the rear end of the plant frame for transport purposes.

2. A plant according to claim 1, wherein the lifting means comprises a front jack and a rear jack for lifting the front and rear of the plant frame respectively.

3. A plant according to claim 2, wherein the front and rear jacks are adapted to lift the front and rear of the plant frame independently.

4. A plant according to claim 1, wherein at least one of the front and rear couplings is connected by a pivot to the plant frame and is pivotable between an extended position for connection with a respective coupling, and a retracted position.

5. A plant according to claim 1, further comprising a discharge conveyor.

6. A plant according to claim 1, further comprising at least one wheeled unit releasably coupled therewith for suspended transport of the plant.

7. A transport device comprising:

a tractor unit having a tractor coupling;

a bogie unit having a bogie coupling;

a material processing plant having a plant frame, the plant frame comprising front and rear ends;

endless tracks supporting the frame and operative to manoevre the plant over the ground in a self-propelled mode;

front and rear couplings provided on the plant frame for releasable engagement with the tractor coupling and the bogie coupling so that the plant can be suspended between the tractor unit and the bogie unit with the endless tracks out of contact with the ground in a transport mode of the plant;

lifting means operative to lift the plant so as to engage the couplings on the tractor unit and the bogie unit for suspended transport of the plant;

wherein the connections between the front and rear couplings of the plant frame to the couplings of the tractor unit and the bogie unit are releasable connections, and wherein said lifting means are operative to allow the plant to be uncoupled from the tractor unit and the bogie unit and to engage the ground via the endless tracks so that the plant can propel itself by the endless tracks and independently of the tractor unit and the bogie unit; and wherein the plant frame comprises a fixed support with said rear coupling mounted thereon, said support being movable downwardly with the plant frame under action of the lifting means to engage the bogie unit so as to suspend the rear end of the plant frame for transport purposes.

8. A method of assembly of a transport device comprising a tractor unit, a bogie unit, a material processing plant, and lifting means operative to connect and disconnect the material processing unit relative to the tractor unit and the bogie unit, wherein:

the tractor unit comprises a tractor coupling; the bogie unit comprises a bogie coupling; and the material processing plant comprises a plant frame comprising front and rear ends, endless tracks supporting the frame and operative to manoeuver the plant over the ground in a self-propelled mode, front and rear couplings provided on the plant frame for releasable engagement with respective couplings on the tractor unit and the bogie unit so that the plant can be suspended between the two units with the endless tracks out of contact with the ground in a transport mode of the plant, and wherein the plant frame comprises a fixed support with said rear coupling mounted thereon, said support being movable downwardly with the plant frame under action of the lifting means to engage the bogie unit so as to suspend the rear end of the plant frame for transport purposes;

the method of assembly comprising the steps of:

extending the lifting means to lift the plant frame from the ground;

inter-engaging the tractor coupling with the front coupling and the bogie coupling with the rear coupling; and, retracting the lifting means thereby suspending the plant between the tractor unit and the bogie unit.

9. A method according to claim 7, wherein the front end of the plant frame is lifted and the front coupling is connected to the tractor coupling before the rear end of the frame is lifted and is connected to the bogie coupling.

10. A plant according to claim 1, wherein said support is adapted to engage a fixed portion of the second wheeled unit.

11. A plant according to claim 7, wherein said support is adapted to engage a fixed portion of the bogie wheeled unit.

12. A method according to claim 8, wherein said support is adapted to engage a fixed portion of the bogie unit.

13. A plant according to claim 10, wherein the fixed support is an inclined support, adapted to engage with a correspondingly inclined fixed portion.

14. A plant according to claim 11, wherein the fixed support is an inclined support, adapted to engage with a correspondingly inclined fixed portion.

15. A method according to claim 12, wherein the fixed support is an inclined support, adapted to engage with a correspondingly inclined fixed portion.

* * * * *